United States Patent Office 3,457,787
Patented July 29, 1969

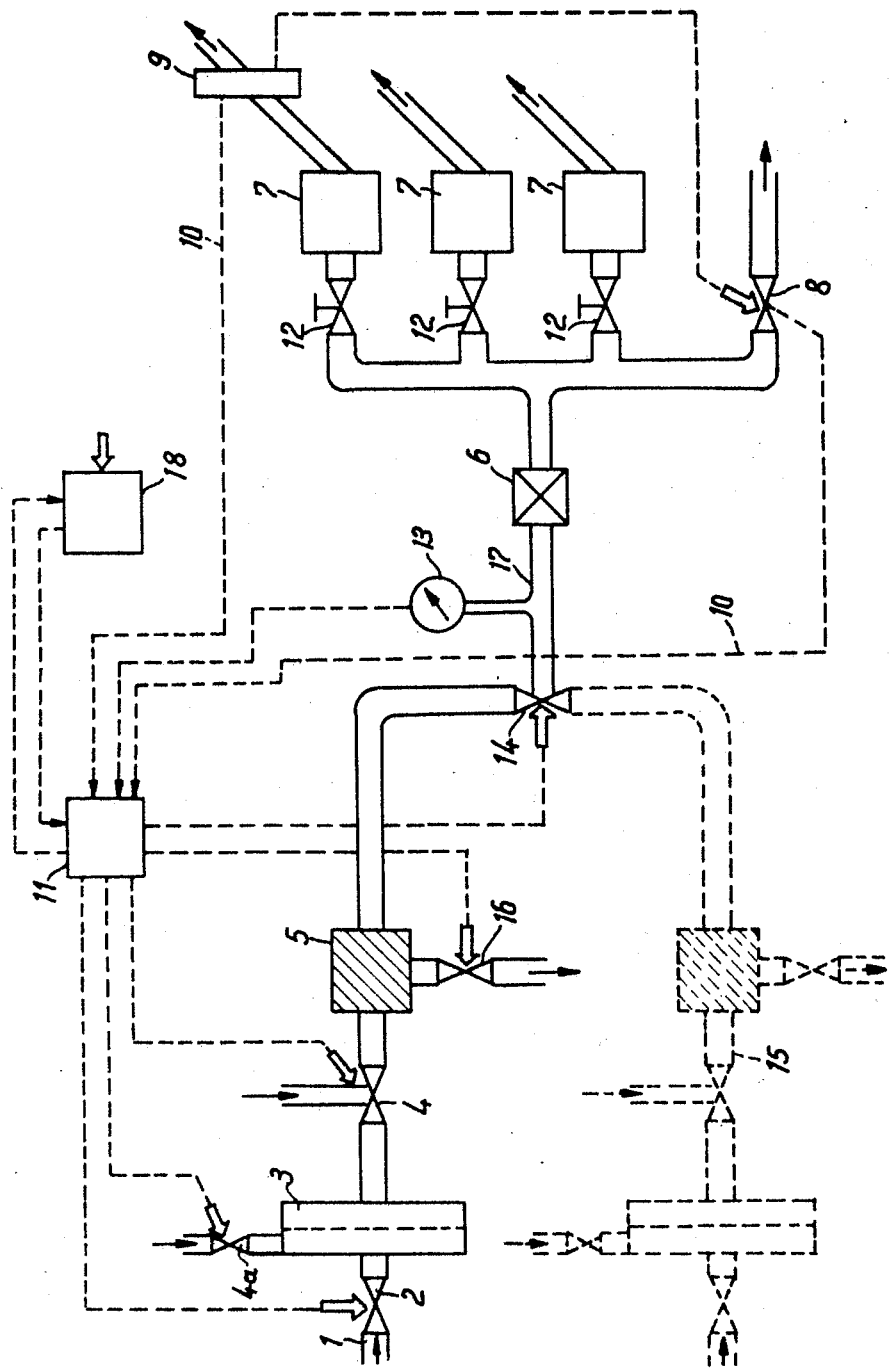

3,457,787
METHOD OF AND APPARATUS FOR THE AUTOMATIC OBSERVATION AND REGENERATION OF DEVICES FOR THE SAMPLING OF WASTE GASES
Jurgen Maatsch, Regen, Horst Achterfeld, Haltern, and Hartmut Kamphaus, Bottrop, Germany, assignors to Beteiligungs- und Patentverwaltungsgesellschaft mit beschrankter Haftung, Essen, Germany, a corporation of Germany
Filed Aug. 2, 1966, Ser. No. 569,633
Claims priority, application Germany, Aug. 17, 1965, B 83,298
Int. Cl. G01n 1/22; B01d 47/00, 53/10
U.S. Cl. 73—421.5
22 Claims

ABSTRACT OF THE DISCLOSURE

An apparatus for sampling gases from a furnace atmosphere and a method for operating the same. The sampled gas is drawn through a filter before being sent to analyzers. Means are provided for maintaining the flow of the gas constant even though the filter collects solid matter. Means are provided to monitor the extent to which the filter is clogged and to automatically flow gas in a reverse direction to clear the filter.

---

The present invention relates to a method of and apparatus for the automatic observation and regeneration of devices for the sampling of waste gases.

In order to obtain, without considerable measuring retardation, important information concerning the course of processes by waste gas analysis in rapidly proceeding chemical reactions, for instance, in metallurgical processes, and particularly in oxygen blowing processes for the production of steel, there has been attempted a sampling device for removal of dust from the waste gases, which generally still contain dust and water vapor. Such a sampling device is, however, not yet part of the prior art. In this device the dust is collected in a relatively small mechanical filter, which is heated to more than 100° C. Due to the relatively small filter volume, the capacity of the filter suffices, however, only for a short period of operation. The dust is blown out of the filter by a brief stream of pressurized gas for about 1 second which is fed through the filter in a direction opposite to that of the stream of the sample of the waste gases, and the ability of the filter to function is restored. The filter device has been found to bring about a very safe operation.

It is one object of the present invention to provide a method of and apparatus for the automatic observation and regeneration of devices for the sampling of waste gases, wherein a sampling of waste gases charged with dust and under certain circumstances with steam over long periods of operation is achieved and simultaneously an automatic regenerating of the sampling device is performed.

It is another object of the present invention to provide a method of and apparatus for the automatic observation and regeneration of devices for the sampling of waste gases wherein due to the pressure drop at a mechanical filter and/or due to the quantity of gas conveyed at a particular moment, the extent to which the filter is charged is observed and a gas stream, which is constant within narrow limits, is fed into analyzers, whereby the measured value of the pressure drop and/or of the measured value of the gas stream is used for the automatic regeneration of the filter and the adjusting of the gas streams, required in the individual analyzers and different in part, and wherein the dust setting on or in the filter or in the filter chamber of the filter housing is returned automatically, even during the metallurgical process in case of a charge of the filter, which charge is too strong, within a short time, for instance, two to three seconds, by a pressure gas from the filter into the main stream, while the constant gas streams are automatically controlled.

It is still another object of the present invention to provide an apparatus for the automatic observation and regeneration of devices for the sampling of waste gases, wherein for the sampling of the waste gases, a probe is provided behind which there are arranged in succession a filter, a feeding pump and parallel-connected gas analyzers, and valves are provided in the gas line, which valves can be controlled by a control apparatus.

With these and other objects in view which will become apparent in the following detailed description, the present invention will clearly be understood in connection with the accompanying drawing, in which the only figure discloses the sampling system by means of a particular embodiment shown schematically by example.

Referring now to the drawing, a sample gas is drawn by suction through a probe 1 from a gas discharge system of an oxygen blowing converter (not shown) by means of an inlet valve 2 into a filter 3 and then through an additional valve 4 and a cooler 5, into a pump 6. From the pump 6 the gas is divided into gas streams which pass through analyzers 7 and a control or regulating valve 8 back into the gas discharge system.

Behind one of the analyzers 7 there is arranged a flowmeter 9 by means of which the regulating valve 8 is controlled. The flowmeter 9 is connected by means of electrical wires 10 with a control apparatus 11, in the same manner as it is connected with the control valve 8. The measurement of the quantity of gas is effected advantageously such that a partial stream of the sample gas is observed through the flowmeter 9. In case the partial stream of gas is too great, the regulating valve 8 is controlled into its opening direction. If the partial gas stream is too small, the regulating valve 8 is controlled in its closing direction. The required division of the streams of sample gas over the different analyzers 7 can be performed by manual valves 12. The totally fed quantity of sample gas must always be equal to the sum of the partial streams of gas required for the analyzers 7. A complete closing of the regulating valve 8 indicates a disturbance of the system and automatically causes the cleaning of the filter by means of the control apparatus 11.

A more favorable observation of the measurement of the quantity of gas is obtained, however, if, by using the vacuum measured with a pressure gauge 13, the total gas stream is at all times maintained somewhat larger than the sum of the required partial streams of gas; that is, the regulating valve 8 always is somewhat open.

If the vacuum, measured by the pressure gauge 13, exceeds a predetermined value, the valve 14 is then closed by means of the control apparatus 11.

At the same time, the valve 4 and possibly valve 4a are opened by means of the control apparatus 11 and pressurized gas is blown through the valves 4 and 4a into the filter 3 and blown out through the probe into the gas discharge system, whereby the dust is removed. Simultaneously with the opening of the valves 4 and 4a, the valve 16 of the cooler 5 is also opened by means of the control apparatus 11, when the removal of dust and the removal of water are to take place simultaneously. If the removal of dust and the removal of water are to take place phase displaced relative to each other, then, with the valve 4 opened, the valves 2, 4a and 16 are alternately opened and closed. In general, a stream of pressurized gas of, for instance, 5 atmospheres gauge for about 1 second will suffice, to remove the dust from the filter 3 and to empty water from the condensation vessel of the cooler 5.

In order to obtain better operational safety, there is advantageously provided a system 15 designed in the same manner, which is disposed in parallel with the sampling device consisting of the probe 1, inlet valve 2, filter 3, valve 4 and cooler 5, the system 15 being indicated in dashed lines.

When two sampling devices are provided, therefore, upon exceeding the vacuum measured by the pressure gauge 13, the valve 14 is switched by means of the control apparatus 11 to the second sampling device and the sampling is continued, while the cleaning of the parallel system takes place automatically.

If the vacuum of the sample gas in the conduit 17 measured by the pressure gauge 13 drops below a given predetermined value which is a function of the system itself, then either the pump is out of order or there is a leak in the line in front of the pump 6. A signal for a disturbance indication of the system is thereupon given by the pressure gauge 13 to the control apparatus 11. If the pump 6 is not operating properly, then the valve 8 will be controlled in the closing direction simultaneously by means of the control apparatus 11 and upon switching to the second sampling device 15, the same disturbance in the system will be indicated. In the second case, a switching to the second sampling device 15 can remove the disturbance, if the leakage lies in the conduit in front of the valve 14. By means of the control apparatus 11, a corresponding disturbing indication of the entire sampling device or only of a part thereof is reported to the control stand 18.

If the vacuum indicated by the pressure gauge 13 does not drop even after repeated regeneration of the filter 3, for instance, after two regenerations, then a disturbance of the sampling device is indicated by means of a signal from the control apparatus 11 to the control stand 18. If two sampling devices are connected in parallel, then, upon switching to the nonregeneratable sampling device, it is immediately switched back. This case is also immediately reported as disturbance to the control stand 18.

Another possibility of regulating the flow of gas resides in controlling the feeding line of the pump 6 by means of the quantity of the waste gases or by the pressure. This, however, presupposes a good capability of regulation on the part of the pump, which frequently requires a large expense for the apparatus.

Although blowing the dust out of the filter 3 and the moisture from the cooler 5 only slightly impairs the measuring process, it is, nevertheless, advantageous to perform the cleaning of the system with a short interruption of the sampling and switching, respectively, of the parallel-connected sampling system as infrequently as possible during the metallurgical process. This is achieved advantageously such, that the regeneration of the filter 3 and the blowing of the water from the condensation vessel of the cooler 5 takes place automatically upon each interruption of the metallurgical process. In the oxygen blowing process, one can automatically perform, for instance, a cleaning process upon rolling the flow lance beyond a predetermined height, which may possibly be repeated several times.

Another very sensitive testing of the sample device, as to its tightness, is also advantageously employed only during rest periods of the operation. The valve 2 is closed, for instance, after a regeneration of the filter 3, while all other valves are ready for operation. If the sampling device is tight, the gas stream will drop to zero within a short time. Otherwise, a quantity of gas will be measured by the flowmeter 9 even after the expiration of a few seconds. A disturbance signal will then be delivered to the control stand 18 from the control apparatus 11. The vacuum obtained under these conditions in front of the pump 6 is also a measure of the tightness of the sample device. With two sampling systems arranged in parallel, the regeneration of the filter and the testing of the tightness advantageously takes place successively.

In the same manner as the filter regeneration and with two parallel sampling systems, and switching from one system to the other, also the tightness testing can advantageously be released upon demand from the control stand 18.

EXAMPLE

On a 3-ton oxygen blowing converter of a semi-industrial pilot plant, a probe of highly refractory material was introduced through the wall into the water-cooled waste gas discharge pipe to a position of about 2.50 m. from the entrance of the waste gas into the waste gas hood. The probe extended about 10 mm. out of the water-cooled wall into the waste gases having temperatures of up to about 1100° C. The inner diameter of the probe was 8 mm. The probe was connected by means of a magnet valve with the filter. The magnet valve and the filter were connected by flange connections so that they could easily be installed and removed. The magnet valve and the filter were heated and maintained at more than 100° C., so that no moisture could there precipitate. The filter housing could easily be disassembled and had, on the side facing the probe, an eddy conduit inserted approximately tangentially from above, through which pressure gas could be blown in by means of the valve 4a. The actual filter was a glass-fabric filter which, after about three batches, filtered off practically all of the finest dust, so that further filtration was not necessary. With a stream of sample gas of 500 to 600 liters/hour the round filter had a diameter of about 100 mm. The dead volume of the filter amounted to nearly 100 cm$^3$. The inner diameter of the lines behind the filter was only 5 mm. The pressure gas, required for cleaning the filter and removing the water from the cooler, was blown in by means of the valve 4. Since only a small amount of pressure gas was required for the removal of the water, the removal of the dust and the removal of the water took place simultaneously. Only about 10% of the pressurized gas flowed with the water of condensation through the valve of the cooler. For the purification, the valve 14 was closed and the valves 4a, 4 and 16 were simultaneously opened for one second, whereby about 3 liters of pressure gas of 5 atmospheres gauge were consumed. After a blast of pressurized gas flow, the filter and the cooler were again capable of operation. The pressurized gas filling the probe up to the valve 16 was fed after the regeneration into the analyzers and there indicated. The short time for cleaning and the small dead volume in the conduits and in the filter resulted in only a short interruption of the feeding of the waste gas to the analyzers and an interruption of about 3 seconds in the indication. Nitrogen proved to be the best pressurized gas under the operating conditions.

The connecting line between the valve 14 and the analyzers was about 9 m. and the indication retardation in the analyzers was about 5 seconds up to 90% of the indication. The entire indicating retardation was scarcely 8 seconds from the entrance of the gas into the probe 1 up to the indication.

In the present example, only one filter system was used. In the course of one blowing period, up to 4 cloggings occurred, i.e., the vacuum at the pressure gauge dropped below 30 mm. Hg and the cleaning processes took place automatically. In the recording tapes for the analyses, there could be noted in each case a small interruption, while adjustment of the position of the lance and of the oxygen stream based on the analyses, was not impaired by the filter regeneration. After every 30 batches, the filter was still completely capable of use and required no maintenance.

While we have disclosed one embodiment of the present invention, it is to be understood that this embodiment is given by example only and not in a limiting sense.

We claim:

1. A method of sampling gas containing at least dust from an oxygen blowing steel production process wherein the sampler includes a conduit leading from the process, a filter in the conduit and analyzers for determining the composition of the sampled gas, comprising the steps of:
feeding a gas sample stream through said conduit,
sensing the flow condition of the sampled gas through the conduit,
adjusting the feeding of sample gas to maintain its rate at a substantially constant rate,
observing the state of charge of the filter by detecting variations in the flow conditions,
regenerating said filter by passing pressurized gas through said filter in a reverse direction when the state of charge of said filter exceeds a predetermined value.

2. The method, as set forth in claim 1, wherein:
said step of observing the state of the charge of said filter is achieved by detecting pressure drop on said filter.

3. The method, as set forth in claim 1, wherein:
said step of observing the state of the charge of said filter is achieved by detecting the gas quantity fed at a particular time.

4. The method, as set forth in claim 1, which includes the step of:
interrupting said sampling during said regeneration of said filter.

5. The method, as set forth in claim 1, which includes the step of:
releasing a stream of said pressurized gas when the quantity of said gas sample stream falls short of a predetermined value.

6. The method, as set forth in claim 1, which includes the step of:
closing the conduits to said analyzers when said pressurized gas is fed to said filter.

7. The method, as set forth in claim 1, which includes the step of:
feeding a greater quantity of said gas stream than required for said analyzers, and leading off the surplus portion of said gas stream by means of a control valve.

8. The method, as set forth in claim 7, which includes the step of:
using the amount of a partial stream of said gas stream as control value for said control valve.

9. The method, as set forth in claim 8, which includes the step of:
indicating a disturbance of the sampling device automatically after repeated regeneration without satisfactory results.

10. The method, as set forth in claim 1, which includes the step of:
using the pressure drop as control value for the gas stream.

11. The method, as set forth in claim 1, which includes the step of:
initiating a signal for a disturbance indication, in case a pressure lower than a predetermined value of said gas stream occurs.

12. The method, as set forth in claim 1, which includes the step of:
controlling the output of a feeding pump disposed in one of said conduits by the quantity of said gas stream and a pressure drop, respectively, and
regulating thereby the quantity of said constant gas stream in said analyzers.

13. The method, as set forth in claim 1, which includes the step of:
blowing out condensed water in case of a humid gas stream by means of an automatically operated valve during the regeneration period of said filter.

14. The method, as set forth in claim 13, which includes the step of:
performing the dust blowing and the water cooling simultaneously.

15. The method, as set forth in claim 1, which includes the step of:
performing automatically the regeneration of said filter and the emptying of a water condensing vessel in one of said conduits by blowing at each interruption of said blowing.

16. The method, as set forth in claim 15, wherein the step of:
performing automatically the regeneration of said filter and the emptying of a water condensing vessel is done during running out of an oxygen blowing lance in said metallurgical process.

17. The method, as set forth in claim 1, which includes the step of:
using the quantity of said gas stream fed by a pump as measure for the tightness of the sampling system, in case of the valve being closed in front of the filter and other valve being ready for operation.

18. The method, as set forth in claim 17, which includes the step of:
using the vacuum obtainable in front of said pump as a measure for the tightness of the sampling system.

19. An apparatus for sampling gas from the oxygen blowing process for the production of steel, wherein the sample gas is freed from dust prior to the analysis, comprising:
a probe adapted for waste gas sampling,
a sampling system including a plurality of members comprising an inlet valve, a filter, a pressure gas valve, a closing valve, a pressure measuring device, a gas feeding pump, and a plurality of parallel disposed gas analyzers, said members being arranged in series behind said probe,
a flow meter operatively connected with one of said analyzers,
a plurality of valves disposed in said gas line, and a control device responsive to said flow meter to adjust said control means to maintain a substantially constant rate of sample flow.

20. The apparatus, as set forth in claim 19, wherein:
said control means comprises a control valve disposed in parallel with said analyzers, and
said control valve is operatively connected with said flow meter and with said control device.

21. The apparatus, as set forth in claim 19, which includes:
a cooler disposed between said pressure gas valve and said closing valve, and said cooler has a discharge valve connected with said control device.

22. The apparatus, as set forth in claim 21, which includes:
two of said probes,
two conduit systems connected with said probes,
each of said conduit systems includes said inlet valve, said filter, said pressure gas valve and said cooler, and
said two conduit systems leading to a single closing valve.

(References on following page)

References Cited

UNITED STATES PATENTS

| | | | |
|---|---|---|---|
| 1,494,855 | 5/1924 | MacMichael | 73—421.5 |
| 1,784,278 | 12/1930 | Dollinger | 55—21 X |
| 2,356,845 | 8/1944 | Hines | 73—421.5 |
| 2,556,832 | 6/1951 | Vollrath | 55—270 X |
| 3,043,145 | 7/1962 | Hoffman | 73—421.5 |

FOREIGN PATENTS 24,234   3/1919   Denmark.

S. CLEMENT SWISHER, Primary Examiner

U.S. Cl. X.R.

55—21, 96, 270, 283